US012638643B2

(12) United States Patent
Liu et al.

(10) Patent No.: US 12,638,643 B2
(45) Date of Patent: May 26, 2026

(54) PHOTONIC INTEGRATED CIRCUIT STRUCTURE

(71) Applicant: ProMOS Technologies Inc., Hsinchu (TW)

(72) Inventors: Ping Ming Liu, Hsinchu (TW); Hsiao Che Wu, Hsinchu (TW)

(73) Assignee: PROMOS TECHNOLOGIES INC., Hsinchu (TW)

( * ) Notice: Subject to any disclaimer, the term of this patent is extended or adjusted under 35 U.S.C. 154(b) by 137 days.

(21) Appl. No.: 18/334,291

(22) Filed: Jun. 13, 2023

(65) Prior Publication Data

US 2024/0134123 A1    Apr. 25, 2024

Related U.S. Application Data

(63) Continuation of application No. 18/046,840, filed on Oct. 14, 2022.

(51) Int. Cl.
| | |
|---|---|
| *G02B 6/42* | (2006.01) |
| *G02B 6/122* | (2006.01) |
| *G02B 6/14* | (2006.01) |
| *G02B 6/30* | (2006.01) |

(52) U.S. Cl.
CPC ......... *G02B 6/4214* (2013.01); *G02B 6/1228* (2013.01); *G02B 6/14* (2013.01); *G02B 6/305* (2013.01)

(58) Field of Classification Search
CPC ........ G02B 6/4214; G02B 2006/12104; G02B 6/30; G02B 6/305; G02B 6/136; G02B 6/124; G02B 6/12002; G02B 6/3829; G02B 6/14; G02B 6/4204; G02B 27/0983; G02B 27/0977
See application file for complete search history.

(56) References Cited

U.S. PATENT DOCUMENTS

| | | | | |
|---|---|---|---|---|
| 5,182,787 | A * | 1/1993 | Blonder | ................ G02B 6/122 |
| | | | | 385/14 |
| 5,263,111 | A * | 11/1993 | Nurse | .................. G02B 6/2817 |
| | | | | 385/130 |
| 10,222,563 | B2 * | 3/2019 | Haase | .................. G02B 6/4204 |
| 10,564,374 | B2 | 2/2020 | Israel et al. | |
| 10,591,694 | B2 | 3/2020 | Paquet et al. | |
| 10,761,279 | B2 * | 9/2020 | Shaw | ....................... G02B 6/13 |
| 10,830,951 | B2 | 11/2020 | Noriki et al. | |
| 11,646,794 | B2 * | 5/2023 | Sengupta | ........... H04B 10/2581 |
| | | | | 398/44 |
| 2018/0231732 | A1 * | 8/2018 | Paquet | ................ H01S 5/18361 |

(Continued)

*Primary Examiner* — Michelle R Connelly
(74) *Attorney, Agent, or Firm* — Craft Chu PLLC; Andrew W. Chu

(57) ABSTRACT

A photonic integrated circuit structure includes a substrate, a waveguide structure and a spot size converter. The waveguide structure is disposed over a surface of the substrate and has a receiving end. The spot size converter includes a concave mirror and a curved mirror. The concave mirror and the curved mirror are opposite to each other and have a common focus. The concave mirror is arranged to reflect a parallel beam from a transmitting end such that a first reflected beam is able to converge at the common focus, and the curved mirror is arranged to reflect the first reflected beam such that a second reflected beam is directed parallel to the receiving end of the waveguide structure.

10 Claims, 11 Drawing Sheets

(56)                    References Cited

U.S. PATENT DOCUMENTS

| | | | |
|---|---|---|---|
| 2019/0339450 A1* | 11/2019 | Noriki .................. | G02B 6/4206 |
| 2023/0077939 A1* | 3/2023 | Liu ...................... | G02B 6/4244 |
| | | | 385/33 |
| 2023/0204877 A1* | 6/2023 | Heck .................... | G02B 6/4214 |
| | | | 385/14 |
| 2024/0027699 A1* | 1/2024 | Psaila .................. | G02B 6/4244 |
| 2024/0027700 A1* | 1/2024 | Psaila .................. | G02B 6/4214 |

* cited by examiner

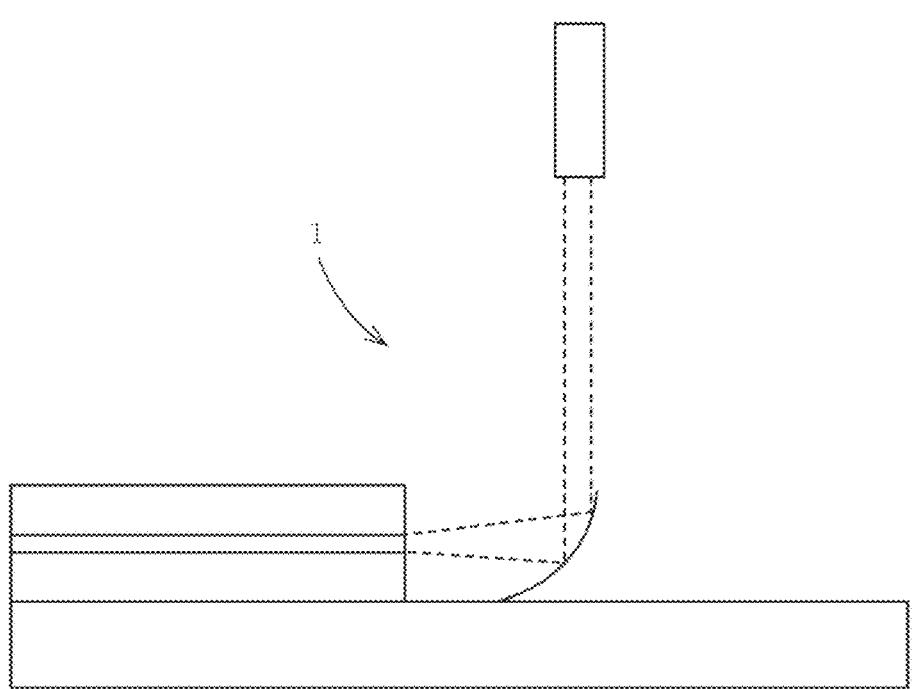
FIG. 1
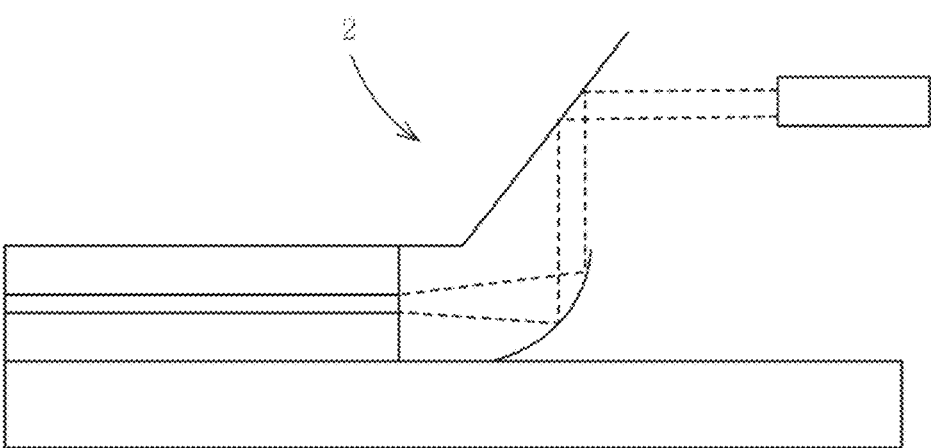
FIG. 2
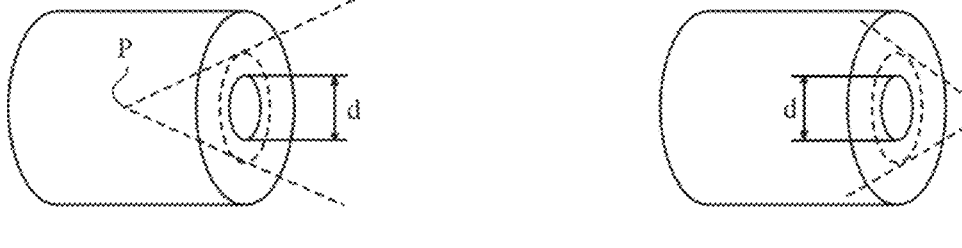
FIG. 3A                                    FIG. 3B

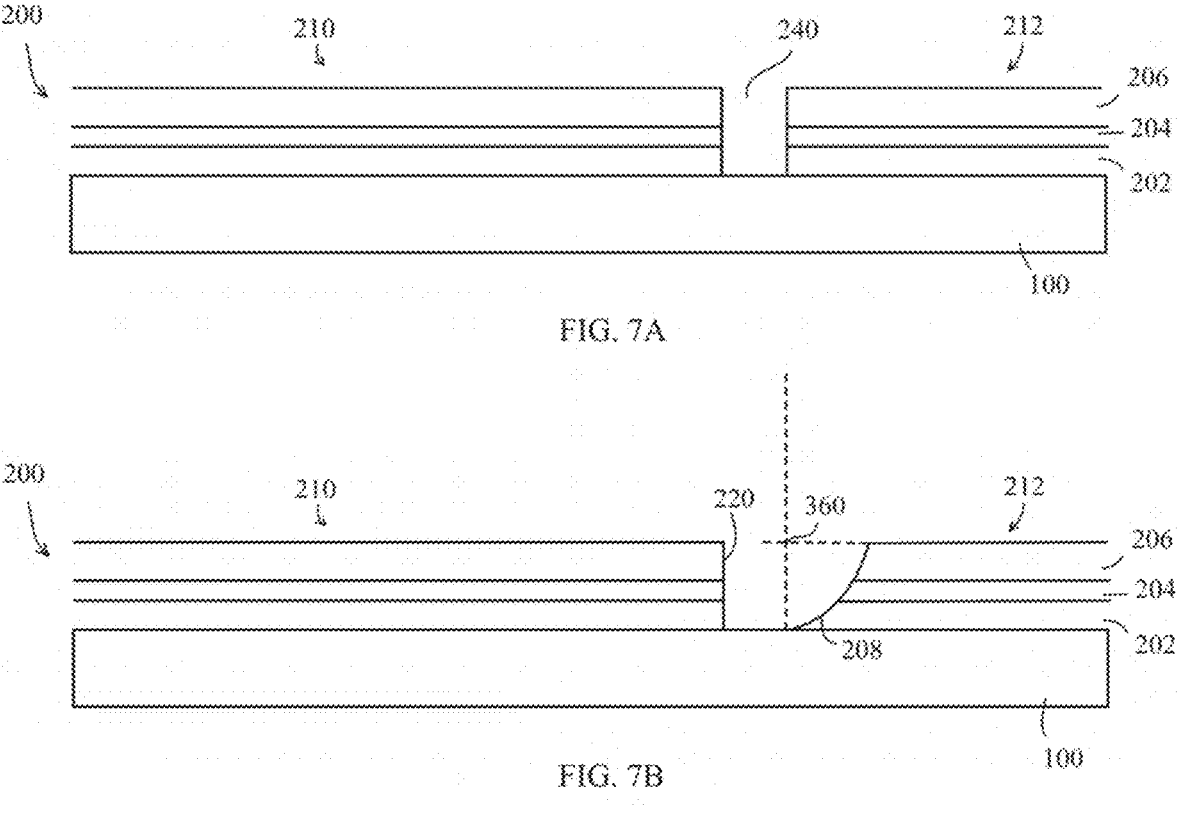
FIG. 7A
FIG. 7B
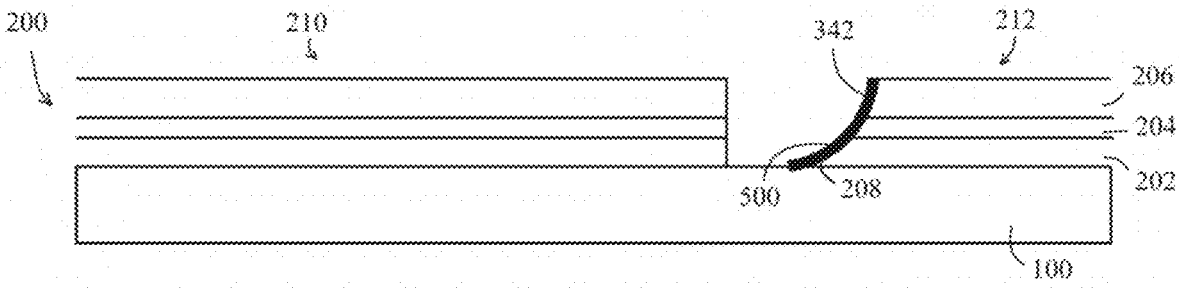
FIG. 7C

1

PHOTONIC INTEGRATED CIRCUIT STRUCTURE

CROSS-REFERENCE TO RELATED APPLICATIONS

The present application claims priority under 35 U.S.C. Section 120 from U.S. patent application Ser. No. 18/046, 840, filed on 14 Oct. 2022, entitled "PHOTONIC INTEGRATED CIRCUIT STRUCTURE". See also Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a photonic integrated circuit structure, and in particular, relates to a photonic integrated circuit structure having a spot size converter, wherein the spot size converter has a concave mirror and a curved mirror which have a common focus.

2. Description of Related Art Including Information Disclosed Under 37 CFR 1.97 and 37 CFR 1.98

In response to the increasing computing speed and the decreasing volume of modern electronic products, photonic integrated circuits have become an important means to solve the circuit complexity. The configuration of light input and output is particularly important. Although the process can be simplified by using a grating coupler, the optical coupling efficiency of the grating coupler largely depends on the wavelength and polarized wave of light. In contrast, an edge coupler can improve the above problems and improve the optical coupling efficiency. However, because the spot size difference between the optical fiber and the optical waveguide is too large, it is necessary to match the spot sizes of the optical fiber and the optical waveguide through the design of a converter structure therebetween to achieve higher optical coupling efficiency. However, at present, the transmission path of the common spot size converter is too long, which makes the structure size of the optical integrated circuit larger. In order to improve the optical coupling efficiency and take into account the size of the optical integrated circuit, the reflector becomes one of the solutions, such as the spot size converter 1 shown in FIG. 1 (for example, U.S. Pat. No. 10,830,951B).

However, as shown in FIG. 1, FIG. 2, FIG. 3A and FIG. 3B, for example, when a concave mirror is used alone or a plane reflector is used in combination with a concave mirror as the spot size converter 2 to change the spot size, the parallel beam will be focused into the waveguide as a conical light beam after being reflected by the concave mirror. If the position of the focus P of the concave mirror is not just aligned with the receiving surface of the waveguide, for example, being too close or too far to the receiving surface of the waveguide, then the spot size of the conical light beam will not match with the diameter d of the receiving core of the waveguide, thereby reducing the optical coupling efficiency. Obviously, the setting position of the concave mirror must be precisely arranged to avoid the following problems: for example, the incident angle of the concave mirror is larger than the receiving critical angle of the waveguide receiving surface when the position of the concave mirror is too close to the receiving surface so that the coupling efficiency is poor; or the transmission path is too long because the position of the concave mirror is too far away from the receiving surface in order to make the spot size smaller, and this further makes the size of the photonic integrated circuit too large.

As can be known from the above description, the structure of the photonic integrated circuits still needs to be improved.

It shall be additionally noted that, the above technical content is used to facilitate the understanding of the problem to be solved by the present invention, which is not necessarily disclosed or known in the art.

BRIEF SUMMARY OF THE INVENTION

An objective of the present invention is to provide a photonic integrated circuit structure, which can improve at least the above problems.

The photonic integrated circuit structure provided by the present invention may comprise a substrate, a waveguide structure and a spot size converter. The substrate has a surface. The waveguide structure is disposed over the surface and has a receiving end. The spot size converter is disposed at a side of the receiving end of the waveguide structure, and comprises a concave mirror and a curved mirror, wherein the concave mirror and the curved mirror are disposed opposite each other and have a common focus. The concave mirror is arranged to reflect a parallel beam from a transmitting end such that a first reflected beam is able to converge at the common focus, and the curved mirror is arranged to reflect the first reflected beam such that a second reflected beam is directed parallel to the receiving end of the waveguide structure.

In an embodiment, a ratio of a curvature radius of the concave mirror to a curvature radius of the curved mirror is equal to a ratio of a core radius of the transmitting end to a core radius of the receiving end.

In an embodiment, the curved mirror is a concave mirror, and the common focus is located in front of a reflection surface of the curved mirror.

In an embodiment, the curved mirror is a convex mirror, and the common focus is located behind a reflection surface of the curved mirror.

In an embodiment, the core radius of the transmitting end is larger than the core radius of the receiving end.

In an embodiment, the core radius of the receiving end is larger than the core radius of the transmitting end.

In an embodiment, the spot size converter is integrally formed.

In an embodiment, the waveguide structure comprises a core formed of a semiconductor material.

The present invention further provides a method for manufacturing a spot size converter of a photonic integrated circuit, wherein the photonic integrated circuit comprises a substrate, a waveguide structure arranged on one surface of the substrate and a stack structure arranged opposite to the waveguide structure, a groove is defined between the waveguide structure and the stack structure, and the waveguide structure has a receiving end. The method may comprise the following steps: forming a curved mirror in the groove; and forming a concave mirror above the waveguide structure, wherein the curved mirror and the concave mirror are disposed opposite to each other and have a common focus. The concave mirror is arranged to reflect a parallel beam from a transmitting end such that a first reflected beam is able to converge at the common focus, and the curved mirror is arranged to reflect the first reflected beam such that a second reflected beam is directed parallel to the receiving end of the waveguide structure.

In an embodiment, the step of forming the curved mirror comprises: fully filling the groove with resin to form a resin layer; patterning the resin layer according to the common focus so as to form the resin layer into a curved surface; and forming a metal layer on the curved surface.

In an embodiment, the step of forming the curved mirror comprises: processing the unetched composite layer (stacked structure) on the opposite side of the receiving end of the waveguide structure to form a curved surface opposite to the receiving end; and forming a metal layer on the curved surface.

In an embodiment, the curved mirror is a concave mirror or a convex mirror.

In an embodiment, the step of forming the concave mirror above the waveguide structure comprises: fully filling the groove with a removable material and covering an area above the waveguide structure with the removable material; molding the removable materials according to the common focus so that one upper surface of the removable materials has a curve; depositing another metal layer on the upper surface of the removable material; removing a part of the another metal layer; and removing the removable material.

The present invention further provides another method for manufacturing a spot size converter of a photonic integrated circuit structure, wherein the photonic integrated circuit structure comprises a substrate and a waveguide structure arranged on a surface of the substrate, and the waveguide structure has a receiving end. The method may comprise the following steps: injecting a light-transmitting plastic into a mold to generate a model, wherein the model comprises a first curved surface and a second curved surface, and the first curved surface and the second curved surface face each other and have a common focus; depositing a metal layer on an outer surface of the model; removing an area of the metal layer other than the first curved surface and the second curved surface to form a conjugate mirror structure; and arranging the conjugate mirror structure on the substrate at one side of the receiving end of the waveguide structure. The first curved surface is arranged to reflect a parallel beam from a transmitting end such that a first reflected beam is able to converge at the common focus; the second curved surface is arranged to reflect the first reflected beam such that a second reflected beam is directed parallel to the receiving end of the waveguide structure.

In an embodiment, the first curved surface is equivalent to a concave mirror, and the second curved surface is equivalent to a concave mirror or a convex mirror.

The present invention further provides another method for manufacturing a photonic integrated circuit structure, which may comprise the following steps: providing a substrate with a surface; forming a composite layer on the surface; processing the composite layer to form a waveguide structure; manufacturing a spot size converter according to any of the above methods; and disposing the spot size converter on the substrate at one side of the receiving end of the waveguide structure.

BRIEF DESCRIPTION OF THE SEVERAL VIEWS OF THE DRAWINGS

FIG. 1 is a schematic side view of a traditional spot size converter.

FIG. 2 is a schematic side view of another traditional spot size converter.

FIG. 3A and FIG. 3B are schematic views showing cases where the spot size does not match the diameter of the receiving core.

FIG. 7A to FIG. 7C are schematic views of a method for manufacturing a curved mirror of a spot size converter of a photonic integrated circuit structure according to another embodiment of the present invention.

DETAILED DESCRIPTION OF THE INVENTION

Specific embodiments according to the present invention will be described below; however, without departing from the spirit of the present invention, the present invention may be practiced in many embodiments of different forms, and the scope claimed in the present invention should not be construed as being limited to those stated in the specification.

Unless the context clearly indicates otherwise, singular forms "a", "the" and similar terms used herein also comprise plural forms, and terms "first" and "second" or the like are used herein to describe various elements or features instead of indicating necessary order or priority of these elements or features. In addition, orientations (e.g., front, back, up, down, left, right, sides, etc.) are relative positions, they can be defined according to the use state of the photonic integrated circuit structure instead of indicating or implying that structures or features need to be placed in a specific direction, and they should not be understood as limitation of the present invention. The "transmitting" and "receiving" of light are also referred to as the transmitting end and the receiving end only for convenience of understanding, and are not intended to limit the present invention; and in fact, the present invention may also transmit light from the receiving end to the transmitting end under the same structure.

The dimension scale and surface curvature of elements in various figures are depicted for convenience of illustration, and are not intended to be limiting.

Figure 4:
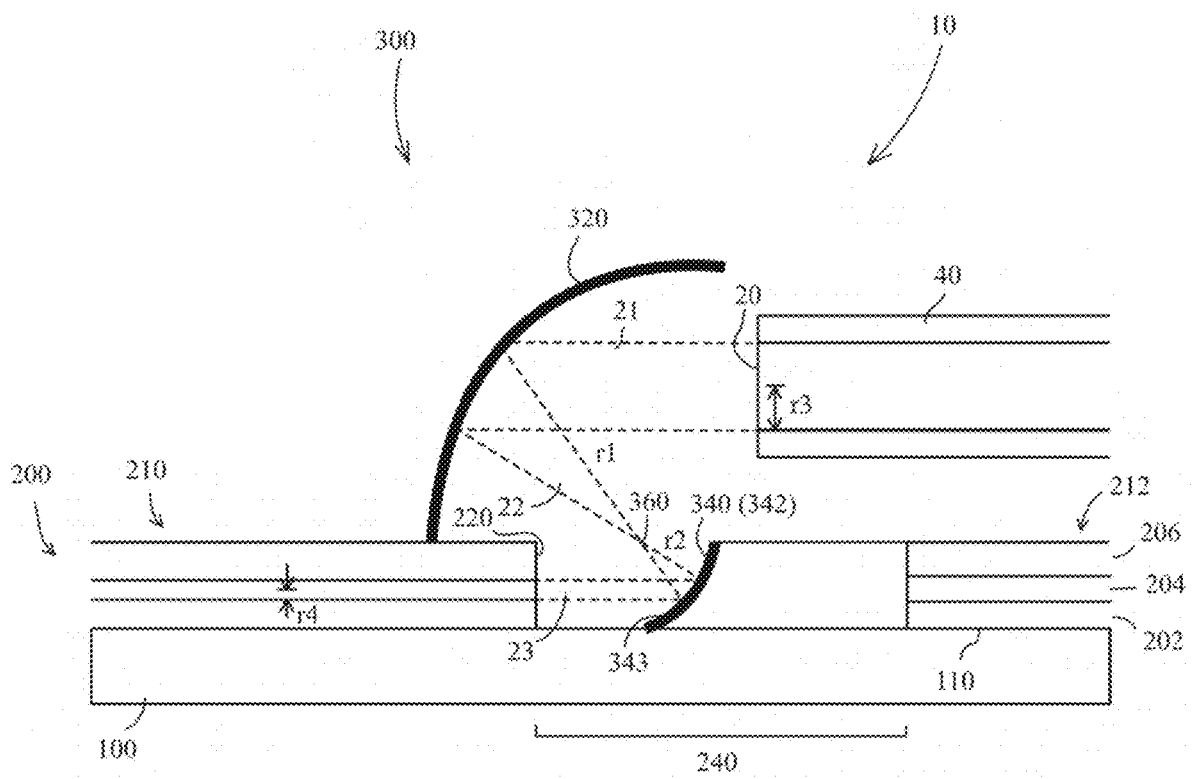
FIG. 4 is a schematic cross-sectional view of a photonic integrated circuit structure according to an embodiment of the present invention.

FIG. 4 is a schematic cross-sectional view of a photonic integrated circuit structure according to an embodiment of the present invention. Referring to FIG. 4, a photonic integrated circuit structure 10 of the present invention is a component for assisting in signal transmission in electronic products, which can solve the problems of signal attenuation and heat generation or the like in traditional copper wire transmission. The photonic integrated circuit structure 10 comprises a substrate 100, a waveguide structure 210 and a spot size converter 300, and receives a parallel beam 21 emitted by a transmitting end 20. The transmitting end 20 may be an end of an optical fiber or an end of a polymer waveguide core, and the optical fiber or the polymer waveguide core may be coated with a cladding layer 40 at the outside thereof. The parallel light beam described herein also encompasses approximately parallel light beams with a small extent of divergence in a short distance.

Figure 5A:
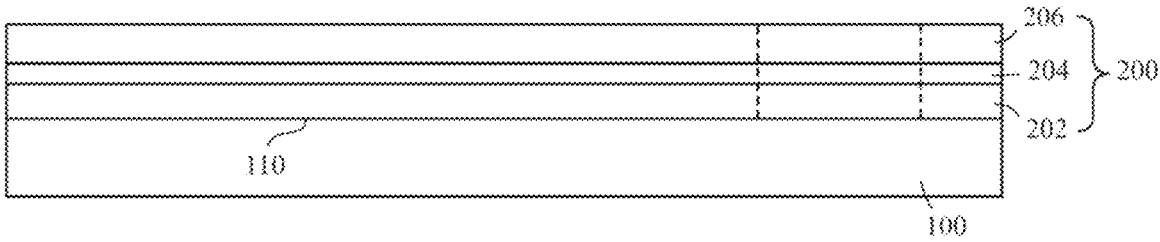
FIG. 5A is a schematic cross-sectional view of a composite layer of a photonic integrated circuit structure according to an embodiment of the present invention.
Figure 5B:
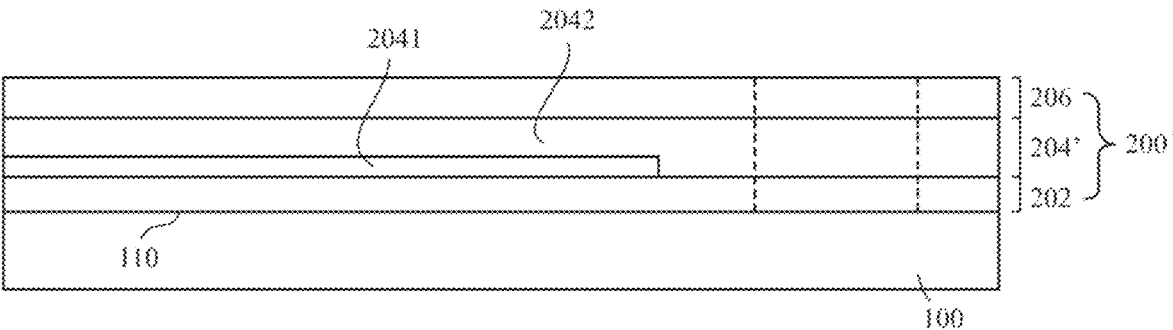
FIG. 5B is a schematic cross-sectional view of a composite layer of a photonic integrated circuit structure according to another embodiment of the present invention.
Figure 6A:
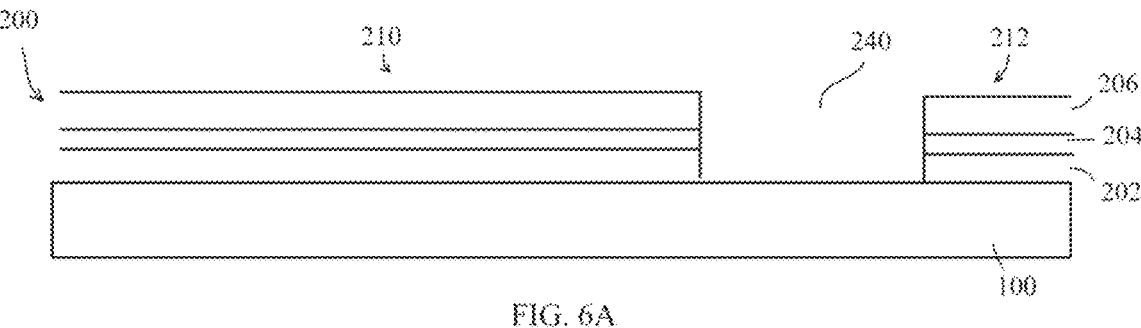
FIG. 6A to FIG. 6D are schematic views of a method for manufacturing a curved mirror of a spot size converter of a photonic integrated circuit structure according to an embodiment of the present invention.
Figure 6B:
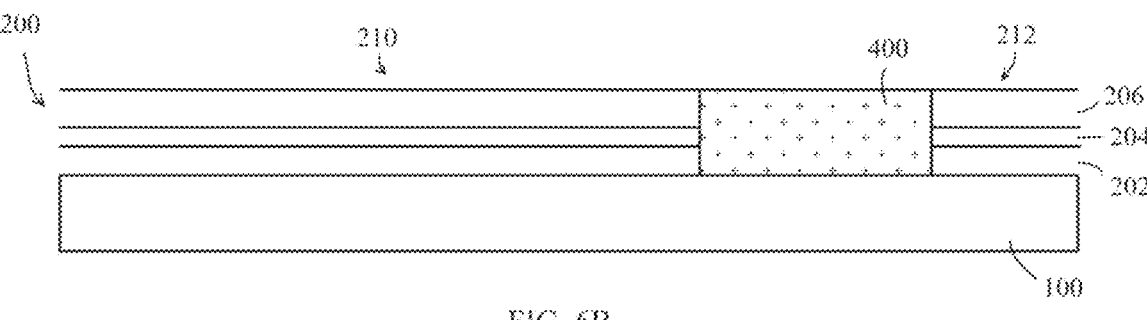
Figure 6C:
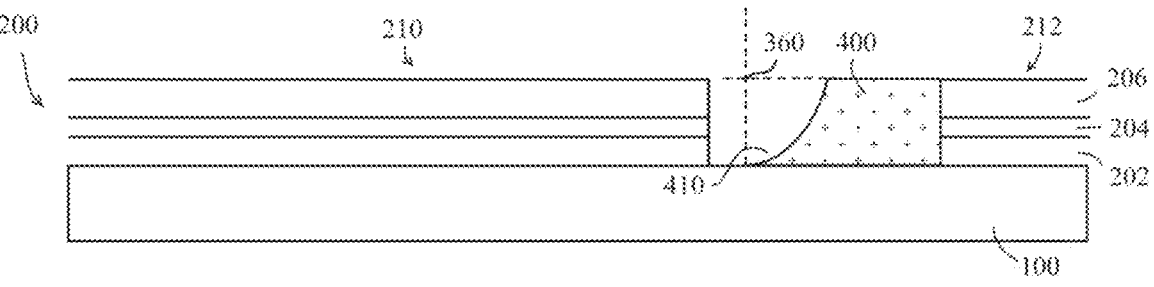
Figure 6D:
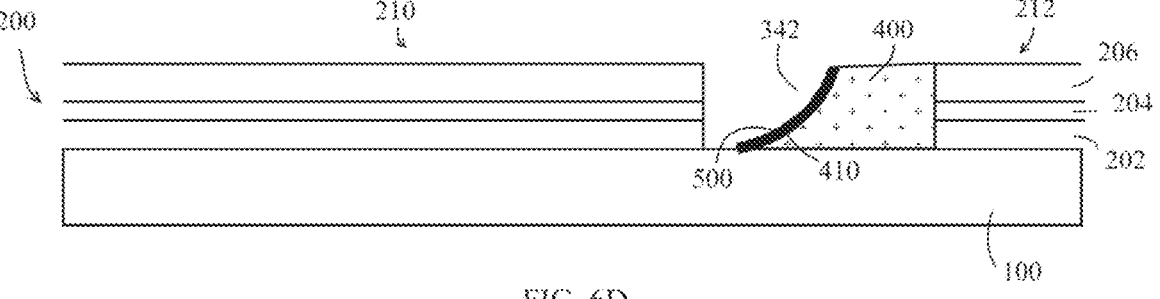
Figures 8A, 8B, 8C, 8D, 8E:
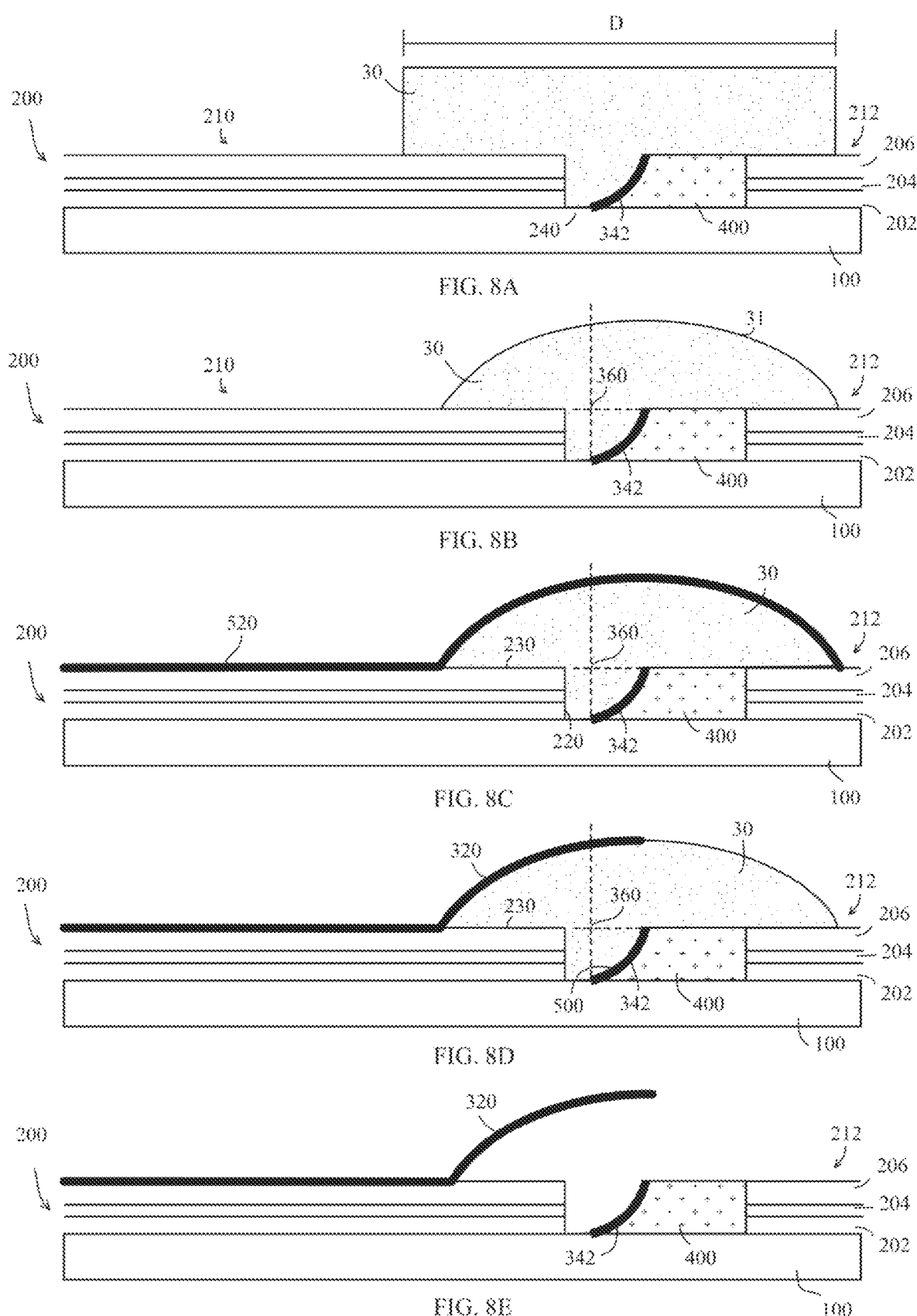
FIG. 8A to FIG. 8E are schematic views of a method for manufacturing a concave mirror of a spot size converter of a photonic integrated circuit structure according to an embodiment of the present invention.
Figures 9A, 9B, 9C, 9D, 9E:
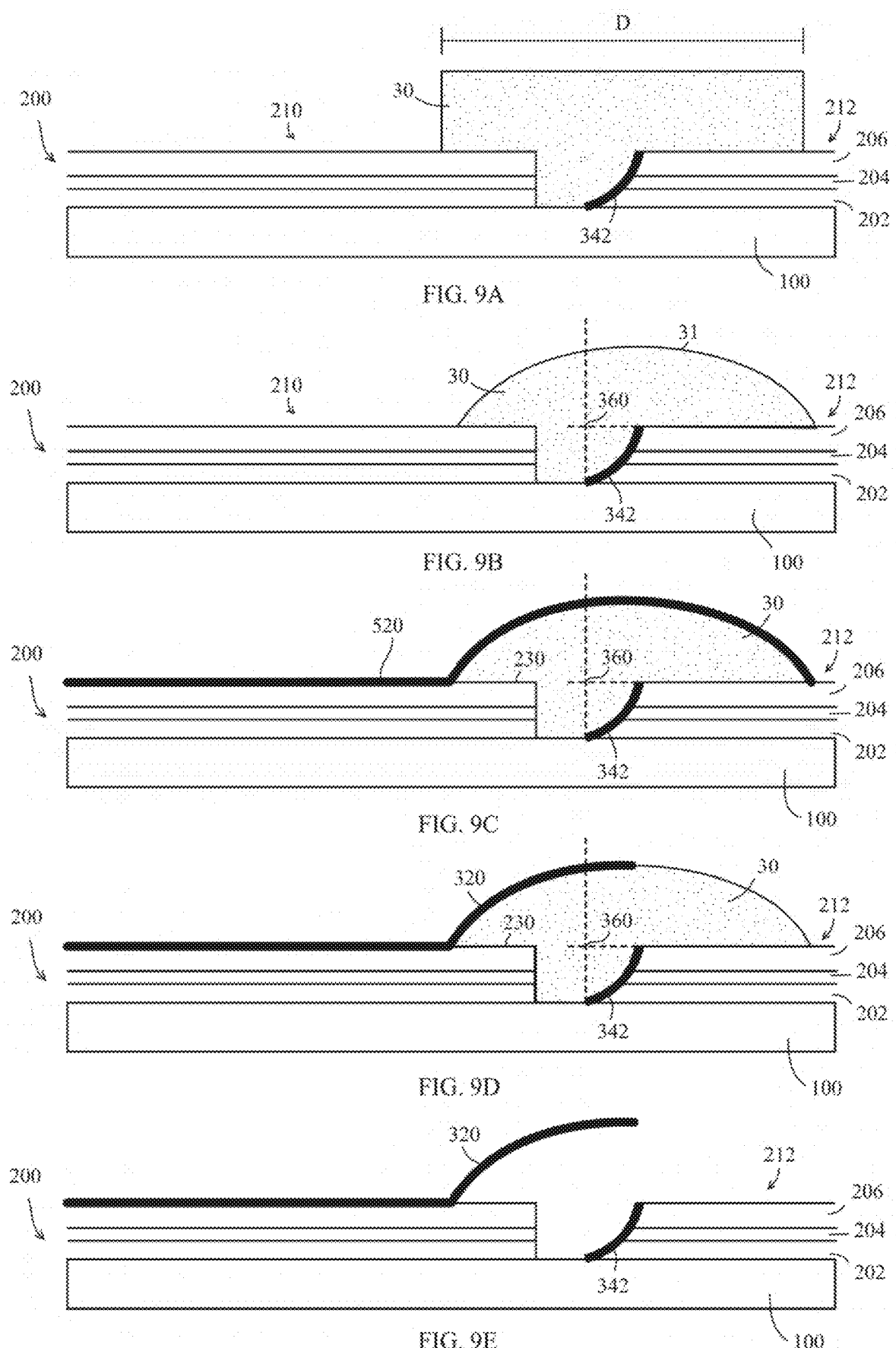
FIG. 9A to FIG. 9E are schematic views of a method for manufacturing a concave mirror of a spot size converter of a photonic integrated circuit structure according to an embodiment of the present invention.

Referring to FIG. 5A, in an embodiment, the substrate 100 has a surface 110, and a composite layer 200 is disposed over the surface 110 and it may comprise a first insulating layer 202, a semiconductor layer 204 and a second insulating layer 206 sequentially disposed from the surface 110; the semiconductor layer 204 is made of a single material (e.g., silicon), but it is not limited thereto. Referring to FIG. 5B, in another embodiment, the substrate 100 has a surface 110, and a composite layer 200′ is disposed over the surface 110 and it may comprise a first insulating layer 202, a semiconductor layer 204′ and a second insulating layer 206 sequentially disposed from the surface 110; the semiconductor layer 204′ may comprise a first material 2041 and a second material 2042, wherein the first material 2041 is made of silicon, and the second material 2042 is made of silicon oxide (SiOx) or silicon oxynitride (a SiON layer) without being limited thereto. The composite layer 200 and the composite layer 200′ may each be processed to form the waveguide structure 210 and a stacked structure 212; for example, the etched part forms a waveguide structure 210, such as a line-shaped waveguide structure, while the unetched part is a stacked structure 212. Please refer to FIG. 4 and FIG. 5A or FIG. 4 and FIG. 5B at the same time, a cross section of the waveguide structure 210 forms a receiving end 220, and the light beam directed to the receiving end 220 of the waveguide structure 210 may be transmitted in the semiconductor layer 204, which is the core formed of a semiconductor material. A groove 240 shown in FIG. 4 may be formed by etching or laser, and the area in which the groove 240 is formed is for example shown by dotted lines in FIG. 5A or FIG. 5B. The spot size converter 300 may comprise a concave mirror 320 and a curved mirror 340, and the concave mirror 320 and the curved mirror 340 are disposed opposite to each other and have a common focus 360. When the curved mirror 340 is a concave mirror, the common focus 360 is located between the concave mirror 320 and the curved mirror 340, i.e., in front of a reflection surface 343 of the curved mirror 340. According to the optical principle, parallel light will converge at a focus after passing through a concave mirror, and oppositely, the light emitted from a focus to the concave mirror will be reflected as parallel light. Therefore, the concave mirror 320 of the present invention may be arranged to reflect a parallel beam 21 from the transmitting end 20 such that the first reflected beam 22 is directed to the curved mirror 340 and converged at the common focus 360. The curved mirror 340 is arranged to reflect the first reflected beam 22 such that a second reflected beam 23 generated after the reflection of the first reflected beam 22 is directed parallel to the receiving end 220. In other words, by making the concave mirror 320 and the curved mirror 340 arranged to have a common focus 360, it is possible to make the light beam transmitted to the receiving end 220 still be the parallel second reflected beam 23. Similarly, the light beam from the receiving end 220 may also be directed parallel to the transmitting end 20 through the reflection of the concave mirror 320 and the curved mirror 340 with the common focus 360.

In an embodiment, a ratio R1 of a curvature radius r1 of the concave mirror 320 to a curvature radius r2 of the curved mirror 340 is equal to a ratio R2 of a core radius r3 of the transmitting end 20 to a core radius r4 of the receiving end 220. This is as shown in the following equation:

$$\frac{r1}{r2} = R1 = R2 = \frac{r3}{r4} \qquad \text{Equation (1)}$$

In this way, when the core radius r3 of the transmitting end 20 is larger than the core radius r4 of the receiving end 220, the spot size converter 300 may convert, almost with no loss, a large-sized spot into a small-sized spot which is almost equal to the core diameter of the receiving end 220 (for example, the diameter of the semiconductor layer 204 in the waveguide structure 210); and since the beam is transmitted to the receiving end 220 in parallel, the problem of the receiving critical angle is also avoided, thereby greatly improving the optical coupling efficiency. Similarly, the core radius r4 of the receiving end 220 may be larger than the core radius r3 of the transmitting end 20.

Hereinafter, the method for manufacturing the spot size converter 300 of the photonic integrated circuit structure 10 of the present application will be described according to the above embodiments, and the following manufacturing steps may all be performed by an automated integrated circuit processing system.

Before the spot size converter 300 is disposed, the photonic integrated circuit structure 10 already comprises a substrate 100 and a composite layer 200. The composite layer 200 may have the same structure as that described above, that is, the etched part is a waveguide structure 210, and the unetched part is a stacked structure 212; a groove 240 is defined between the waveguide structure 210 and the stacked structure 212, and the groove 240 may expose part of the substrate 100. A cross section of the groove 240, i.e., the cross section of the waveguide structure 210, forms the receiving end 220.

In this embodiment, the curved mirror 340 will be implemented as a concave mirror 342 (which is referred to as a first concave mirror 342 in this embodiment), and the method for manufacturing the spot size converter 300 comprises the following steps: forming a first concave mirror 342 in the groove 240; and forming a concave mirror 320 (which is referred to as a second concave mirror 320 in this embodiment) above the waveguide structure 210 such that the first concave mirror 342 and the second concave mirror 320 have a common focus 360, and in this way, the second concave mirror 320 may reflect a parallel beam 21 from the transmitting end 20 such that a first reflected beam 22 is directed to the first concave mirror 342 and converged at the common focus 360, and then the first concave mirror 342 reflects the first reflected beam 22 such that a second reflected beam 23 is directed parallel to the receiving end 220.

In an embodiment, the method of forming the first concave mirror 342 is as shown in FIG. 6A to FIG. 6D. In detail, first the groove 240 is fully filled with resin to form a resin layer 400. Then, according to the preset position of the common focus 360, the resin layer 400 is patterned to form the resin layer 400 into a curved surface 410. Finally, a metal layer 500 is formed on the curved surface 410 to form the first concave mirror 342. The method described above of fully filling the resin layer 400 may be performed by spin coating, and the resin layer 400 may be photosensitive resin, polyimide resin or epoxy resin. The method of patterning described above may be a photolithography method, and the resin layer 400 is exposed by masks with different light transmittance so that the resin layer 400 is irradiated with different amounts of light at different positions. Thereafter, the resin layer 400 is developed to dissolve or leave areas irradiated with different amounts of light so as to form the curved surface 410. The above forming method may be as follows: covering the area other than the resin layer 400 with a mask, and depositing the metal layer 500 on the curved surface 410 by evaporation, sputtering or any suitable deposition method. Alternatively, first the metal layer 500 may be fully deposited on the etched waveguide structure 210 and the stacked structure 212, the curved surface 410 is covered with a mask, and then the metal layer 500 outside the curved surface 410 is removed by developing and etching again to leave the metal layer 500 on the curved surface 410 as the first concave mirror 342.

In another embodiment, the method for forming the first concave mirror 342 is as shown in FIG. 7A to FIG. 7C. In detail, the stacked structure 212 is first processed to form the curved surface 208, and the method may be as follows: after the waveguide structure 210 and the stacked structure 212 are formed in the composite layer 200, the stacked structure 212 (the side opposite to the receiving end 220), i.e., the right side of the groove 240 shown in the figure, is etched to form a curved surface 208; alternatively, a part of the composite layer 200 may be removed by laser processing to form the groove 240 with the curved surface 208 directly. Then, a metal layer 500 is formed on the curved surface 208 to form the first concave mirror 342. The method of etching the stacked structure 212 may be performed for example by dry etching, wet etching or photo etching. The method for forming the metal layer 500 may be performed as those described in the previous paragraph.

In an embodiment, the method of forming the second concave mirror 320 above the waveguide structure 210 is as shown in FIG. 8A to FIG. 8E. In another embodiment, the method of forming the second concave mirror 320 above the waveguide structure 210 is as shown in FIG. 9A to FIG. 9E. In the two embodiments, first the groove 240 is fully filled with a removable material 30, and a predetermined area D (which may encompass the waveguide structure 210 and/or the stacked structure 212) above the composite layer 200 is covered with the removable material 30, and then the removable material 30 is molded according to the common focus 360 so that an upper surface 31 of the removable material 30 has a curve. Then, a metal layer 520 is deposited on the upper surface 31 of the removable material 30. Then, after removing a part of the metal layer 520, the removable material 30 is removed to form the second concave mirror 320.

In detail, the removable material 30 may be a polymer material or a UV curable material. The size of the predetermined area D is set according to the preset position of the common focus 360, the predetermined placement position of the second concave mirror 320 and the curvature. Preferably, the common focus 360 may be at the intersection of half the curvature radius of the first concave mirror 342 and half the curvature radius of the second concave mirror 320, which may be located on the extension plane of a top surface 230 of the waveguide structure 210 forming the receiving end 220. According to the preset position of the common focus 360, the removable material 30 is compressed using a female mold with a predetermined shape, thereby forming a semi-circular or semi-elliptical shape. Alternatively, part of the removable material 30 is roughly removed by photolithography, and then the removable material is heated to form the same shape of smooth surface so that the upper surface 31 of the removable material 20 has a curve. In this embodiment, after the metal layer 520 is deposited on the upper surface 31, the unnecessary part (e.g., the right half in the figure) is removed, and then the second concave mirror 320 may be formed simply by removing all the removable material 30. According to the composition of the removable material 30, stripping, etching and the like are optionally used to remove the removable material 30.

In an embodiment, the first concave mirror 342 may be manufactured first, and then the second concave mirror 320 is manufactured. In an embodiment, the second concave mirror 320 may be manufactured first, and then the first concave mirror 342 is manufactured.

Figure 10:
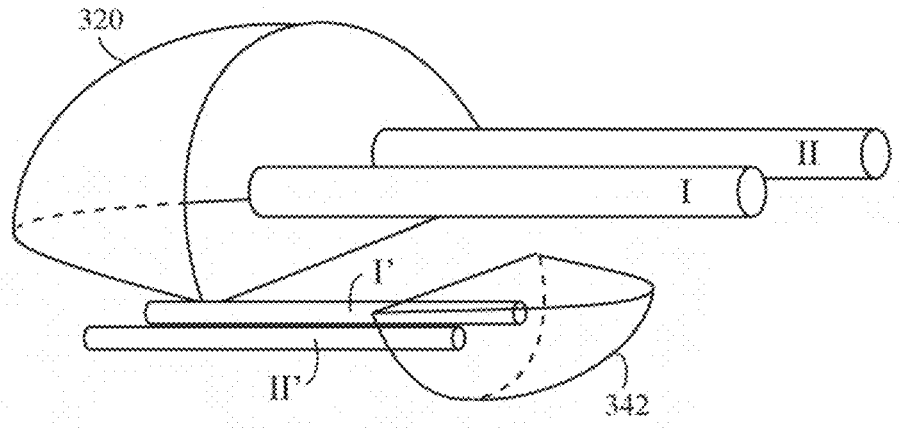
FIG. 10 is a schematic perspective view of a spot size converter of a photonic integrated circuit structure according to an embodiment of the present invention.
Figure 11:
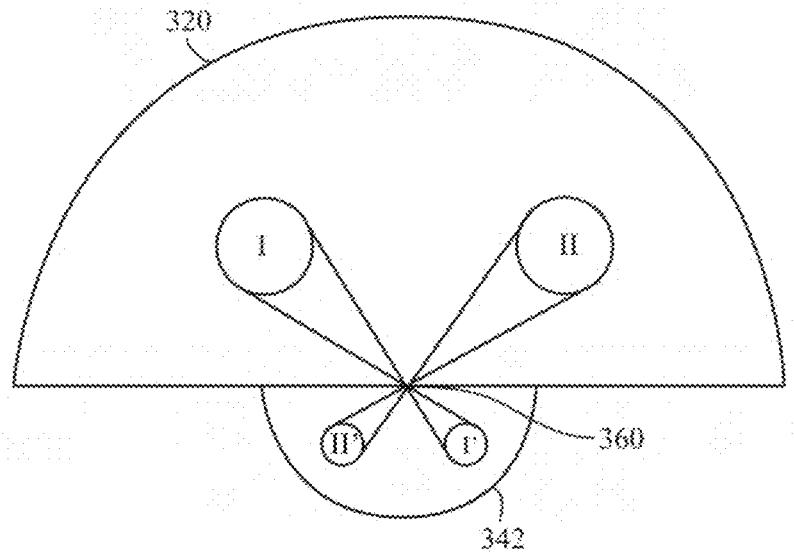
FIG. 11 is a schematic side view, viewed from a transmitting end, of a spot size converter of a photonic integrated circuit structure according to an embodiment of the present invention.

FIG. 10 to FIG. 11 are schematic perspective views of a spot size converter 300 which may comprise a plurality of transmitting and receiving pairs at the same time. As shown in FIG. 10 to FIG. 11, after light rays I and II are incident on and reflected by the second concave mirror 320, they will be reflected outside symmetrically from the first concave mirror 342 as reflected light rays I' and II'. FIG. 11 is a schematic side view of the spot size converter 300 viewed from the transmitting end 20, and from FIG. 11, it can be clearly seen that the light rays I and II are incident on the second concave mirror 320 and then reflected by the second concave mirror 320 to the first concave mirror 342 as reflected light rays I' and II' which are in symmetrical relationships with the light rays I and II.

Figures 12, 13:
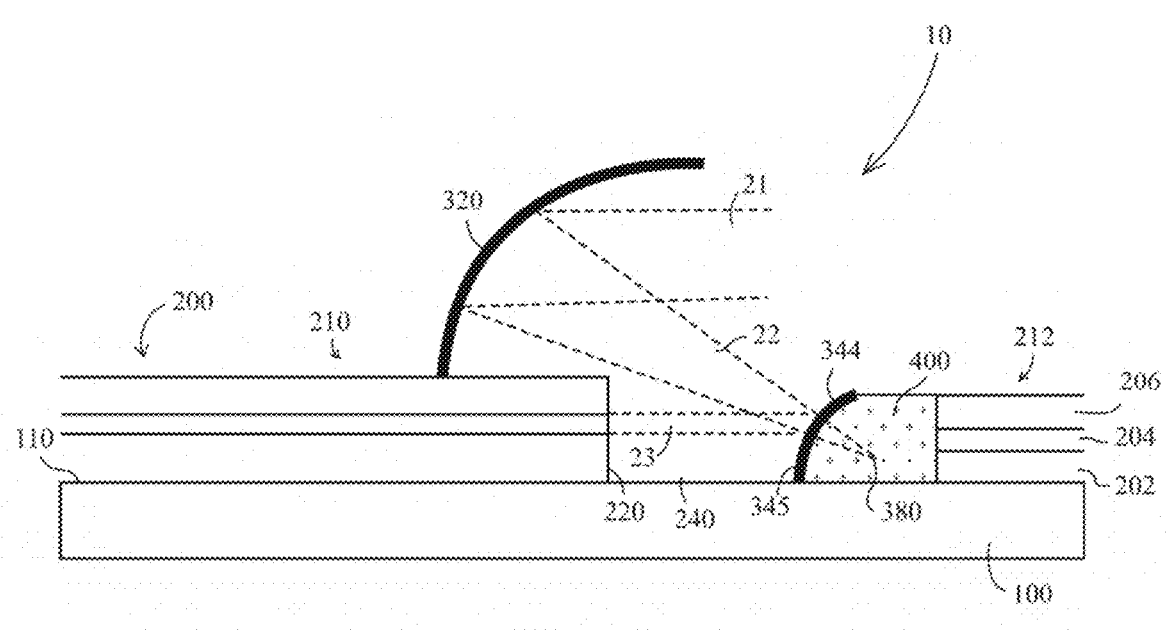
FIG. 12 is a schematic cross-sectional view of a photonic integrated circuit structure according to an embodiment of the present invention.
FIG. 13 is a schematic cross-sectional view of a photonic integrated circuit structure according to another embodiment of the present invention.

According to the optical principle, in an embodiment, the curved mirror 340 of the present invention may also be implemented as a convex mirror 344, and has the same function as the first concave mirror 342. In detail, in different embodiments as shown in FIG. 12 and FIG. 13, by providing the concave mirror 320 and the convex mirror 344 which have a common focus 380, the concave mirror 320 may be arranged to reflect a parallel beam 21 from the transmitting end 20 such that a first reflected beam 22 is able to converge at the common focus 380 (to be directed to the convex mirror 344), and the convex mirror 344 may be arranged to reflect the first reflected beam 22 so that the first reflected beam 22 which is going to be converged (but has not been actually converged) at the common focus 380 is reflected as the second reflected beam 23, and the second reflected beam 23 is directed parallel to the receiving end 220. In this embodiment, the common focus 380 is located at a position behind a reflection surface 345 of the convex mirror 344 (on the right side in the figure). The method of manufacturing the convex mirror 344 is similar to the above method of manufacturing the first concave mirror 342, and basically, the convex mirror 344 is manufactured by depositing the metal layers 500 and 520 on the resin layer 400 or the stacked structure 212, and the details will not be repeated herein.

Figure 14:
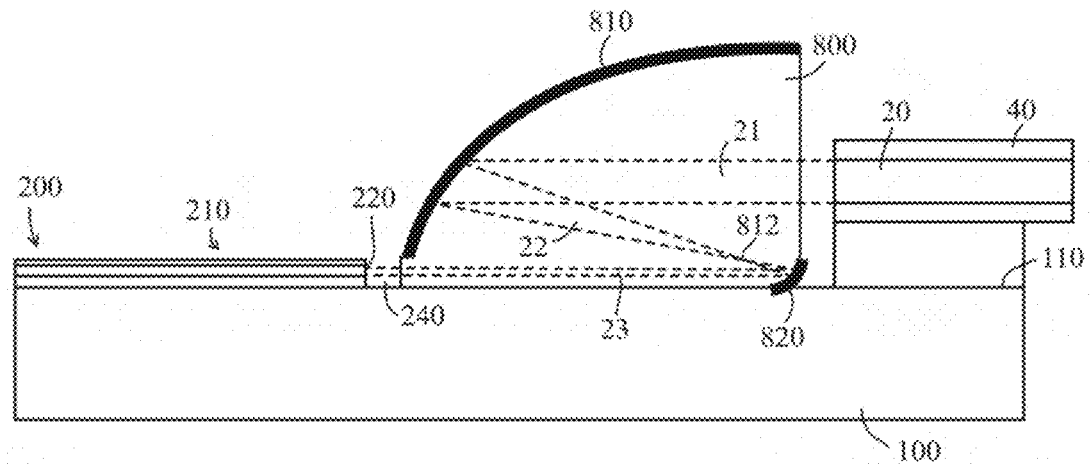
FIG. 14 is a schematic cross-sectional view of a photonic integrated circuit structure according to yet another embodiment of the present invention.

As shown in FIG. 14, in an embodiment, the spot size converter 300 of the photonic integrated circuit structure 10 of the present invention may be replaced by an integrally formed spot size converter 800, i.e., a conjugate mirror structure (i.e., a combination of a plurality of mirrors with a common focus). In this embodiment, the photonic integrated circuit structure 10 also comprises a substrate 100 and a composite layer 200 disposed over a surface 110 of the substrate 100. The composite layer 200 may have the same structure as that described above; that is, the etched part forms a waveguide structure 210, and the unetched part is a stacked structure 212. A groove 240 is defined between the waveguide structure 210 and the stacked structure 212, and the groove 240 may expose a part of the substrate 100, and the waveguide structure 210 has a receiving end 220, but it is not limited thereto. The composite layer 200 may only have the waveguide structure 210, and the optical fiber or polymer waveguide core with the cladding layer 40 which is disposed opposite to the waveguide structure 210 may be disposed on a base material of any form to emit or receive parallel light beams. The spot size converter 800 is one integrally formed model, the model comprises a first curved surface 810 and a second curved surface 820, and the first curved surface 810 and the second curved surface 820 face each other and have a common focus 812.

Figure 15:
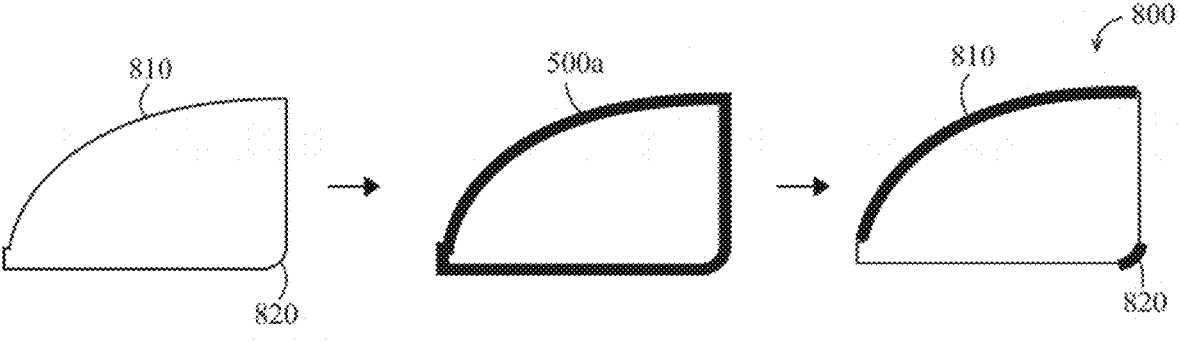
FIG. 15 is a schematic view of a method for manufacturing a spot size converter of a photonic integrated circuit structure of FIG. 14.

As shown in FIG. 15, in an embodiment, the method for manufacturing the spot size converter 800 may comprise the following steps. First, a light-transmitting plastic is injected into a mold to generate a model, and the model comprises a first curved surface 810 and a second curved surface 820 which face each other and have a common focus 812. Then, after the model is taken out from the mold, first a metal layer 500a is deposited on the outer surface of the model, and then an area other than the first curved surface 810 and the second curved surface 820 is removed from the metal layer 500a to form an integrally formed spot size converter 800, i.e., form a reflective conjugate mirror group (a conjugate mirror structure). Finally, the spot size converter 800 is disposed in the groove 240 or on the surface 110 of the substrate 100 at one side of the receiving end 220 of the waveguide structure 210. As shown in FIG. 14, the first curved surface 810 may be arranged to reflect a parallel beam 21 from the transmitting end 20 such that the reflected first beam 22 is able to converge at the common focus 812, and the second curved surface 820 may be arranged to reflect the first reflected beam 22 such that the second reflected beam 23 is directed to the receiving end 220 in parallel. Similarly, the light beam from the receiving end 220 may also be directed to the transmitting end 20 in parallel via the reflection of the conjugate mirror structure with the common focus 812. In other words, the first curved surface 810 and the second curved surface 820 may have the same features and functions as the concave mirror 320 and the curved mirror 340, so they also have the effect of converting the spot size almost with no loss.

The material used to make the above-mentioned conjugate mirror group (i.e., the above-mentioned light-transmitting plastic) may comprise polycarbonate (PC), polymethyl methacrylate (PMMA), polyethylene terephthalate-1,4-cyclohexanedimethanol ester (PETG), advanced ethyl urethane polymer (Trivex), Mitsui Chemical Resin (MR) or the like. PC has characteristics of collision resistance, abrasion resistance, ultraviolet resistance and high light transmittance or the like, and is 60% lighter than traditional glass and 35% lighter than traditional resin lenses. PMMA (commonly known as acrylic) has characteristics such as a light transmittance of above 92%, corrosion resistance for many chemicals, weather resistance and good cutting performance, and the material molded by PMMA may be easily machined into various required sizes. PETG has tough characteristics, and the extruded sheet is 15 to 20 times tougher than general acrylic, so it is easier to be processed than acrylic or PC, it can easily produce products with complex shapes and large stretch ratio, and it has enough bearing capacity in the process of processing, transportation and use, which helps to prevent cracking; moreover, it may be subjected to pile coating, electroplating, static electricity or other processing, and it can also tolerate a variety of chemicals and detergents. The Trivex material is light in weight, has the same impact resistance as PC, and has chemical solutions resistance and wear resistance; and the Abbe number, which indicates the degree of light dispersion resistance, is 14 times higher than PC. Although the impact resistance of MR is weaker than that of PC and Trivex, it is better than that of traditional resin lenses, and it also has better weather resistance and chemical resistance.

Figure 16:
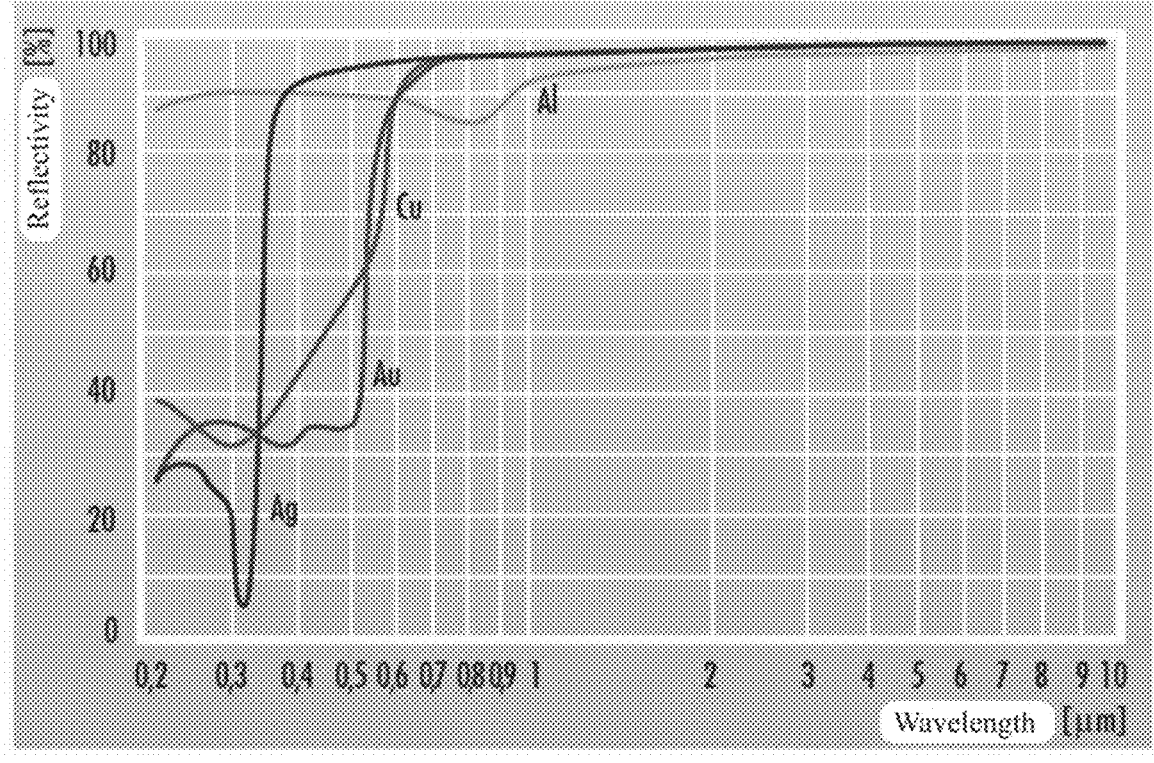
FIG. 16 is a schematic reference diagram of the change between the wavelength and reflectivity of a metal layer used to manufacture the photonic integrated circuit structure of the present invention.

As shown in FIG. 16, according to spectral analysis (for example, infrared light (VIS) analysis or near infrared light (NIR) analysis), silver (Ag) has the highest reflectivity, the reflectivity of gold (Au) is similar to that of copper (Cu) and silver (Ag), and aluminum (Al) has a relatively constant reflectivity and has the highest reflectivity in ultraviolet light. The materials of the metal layers 500, 520 and 500a in the above embodiments may be selected from gold, silver, copper and aluminum.

According to the above descriptions, the photonic integrated circuit structure of the present invention can convert the spot size almost with no loss so that the optical coupling efficiency is not affected by the wavelength and polarization wave of light, and the conical light beam would not be formed so that the problem that the position of the reflector needs to be precisely arranged to be aligned with the receiving end is solved. In addition, in some embodiments, the process required to realize the common focus can be further simplified by implementing the spot size converter as a reflective conjugate mirror group.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

We claim:

1. A method for manufacturing a spot size converter of a photonic integrated circuit, wherein the photonic integrated circuit comprises a substrate, a waveguide structure arranged on one surface of the substrate and a stack structure arranged opposite to the waveguide structure, a groove is defined between the waveguide structure and the stack structure, and the waveguide structure has a receiving end, the method comprising:

forming a curved mirror in the groove; and forming a concave mirror above the waveguide structure, wherein the curved mirror and the concave mirror are disposed opposite to each other and have a common focus;

wherein the concave mirror is arranged to reflect a parallel beam from a transmitting end such that a first reflected beam is able to converge at the common focus, and the curved mirror is arranged to reflect the first reflected beam such that a second reflected beam is directed parallel to the receiving end of the waveguide structure, wherein said first reflected beam is configured to propagate along a non-guided optical path before being reflected by said curved mirror into said second reflected beam, and wherein the step of forming the concave mirror above the waveguide structure further comprises:

fully filling the groove with a removable material and covering an area above the waveguide structure and the stack structure with the removable material;

molding the removable materials according to the common focus so that one upper surface of the removable materials has a curve;

depositing another metal layer on the upper surface of the removable material;

removing a part of the another metal layer so as to form the concave mirror with the another metal layer on said curve; and removing the removable material from the groove and the area above the waveguide structure and the stack structure.

2. The method according to claim 1, wherein the step of forming the curved mirror further comprises:

fully filling the groove with resin to form a resin layer;

patterning the resin layer according to the common focus so as to form the resin layer into a curved surface; and forming a metal layer on the curved surface.

3. A method for manufacturing a photonic integrated circuit structure, comprising:

providing a substrate with a surface;

forming a composite layer on the surface;

processing the composite layer to form a waveguide structure;

manufacturing the spot size converter according to the method of claim 2; and disposing the spot size converter on the substrate at one side of the receiving end of the waveguide structure.

4. The method according to claim 1, wherein the step of forming the curved mirror further comprises:

processing the stack structure on the opposite side of the receiving end of the waveguide structure to form a curved surface opposite to the receiving end; and forming a metal layer on the curved surface.

5. A method for manufacturing a photonic integrated circuit structure, comprising:

providing a substrate with a surface;

forming a composite layer on the surface;

processing the composite layer to form a waveguide structure;

manufacturing the spot size converter according to the method of claim 4; and disposing the spot size converter on the substrate at one side of the receiving end of the waveguide structure.

6. The method according to claim 1, wherein the curved mirror is a concave mirror or a convex mirror.

7. A method for manufacturing a photonic integrated circuit structure, comprising:

providing a substrate with a surface;

forming a composite layer on the surface;

processing the composite layer to form a waveguide structure;

manufacturing the spot size converter according to the method of claim 6; and disposing the spot size converter on the substrate at one side of the receiving end of the waveguide structure.

8. The method according to claim 1, wherein a ratio of a curvature radius of the concave mirror to a curvature radius of the curved mirror is equal to a ratio of a core radius of the transmitting end to a core radius of the receiving end.

9. A method for manufacturing a photonic integrated circuit structure, comprising:

providing a substrate with a surface;

forming a composite layer on the surface;

processing the composite layer to form a waveguide structure;

manufacturing the spot size converter according to the method of claim 8; and disposing the spot size converter on the substrate at one side of the receiving end of the waveguide structure.

10. A method for manufacturing a photonic integrated circuit structure, comprising:

providing a substrate with a surface;

forming a composite layer on the surface;

processing the composite layer to form a waveguide structure;

manufacturing the spot size converter according to the method of claim 7; and disposing the spot size converter on the substrate at one side of the receiving end of the waveguide structure.

* * * * *